UNITED STATES PATENT OFFICE.

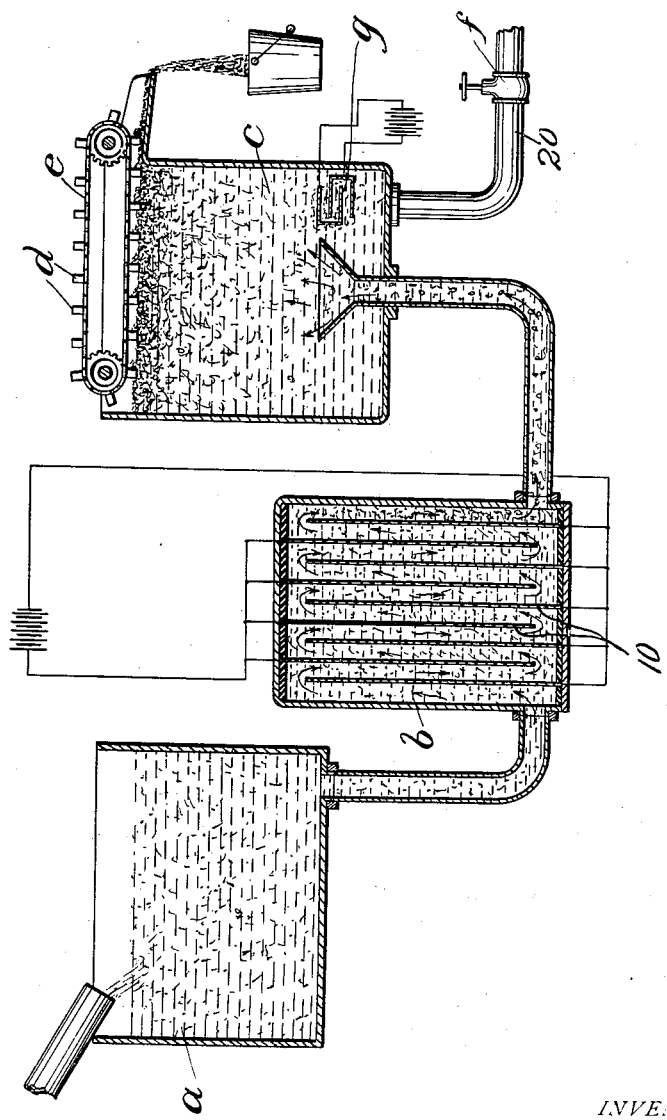

HOWARD PARKER, OF NASHUA, NEW HAMPSHIRE, ASSIGNOR TO THE IMPROVED PAPER MACHINERY COMPANY, OF NASHUA, NEW HAMPSHIRE, A CORPORATION OF MAINE.

SEPARATING APPARATUS.

1,069,169.      Specification of Letters Patent.      Patented Aug. 5, 1913.

Application filed February 28, 1911. Serial No. 611,405.

*To all whom it may concern:*

Be it known that I, HOWARD PARKER, a citizen of the United States, and a resident of Nashua, in the county of Hillsboro, State of New Hampshire, have invented certain new and useful Improvements in Separating Apparatus, of which the following is a specification.

There are many instances in the various arts where it is necessary to utilize water or some other liquid to carry in suspension the material which is to be utilized in the manufacturing process, in a more or less finely divided state. For instance in paper making the pulp is carried in suspension in water and flooded onto the paper making machine, and when a colored paper is to be made the coloring matter is mixed with the stock before it is supplied to the machine. There are numerous other cases where it is impossible or impractical to handle the material which is to be manufactured except in some similar way. It is apparent that the waste water from these machines carries away with it considerable quantities of material, resulting in a serious financial loss in the course of time. This waste water is usually discharged into streams of running water and in many cases carries with it deleterious matter which pollutes the streams rendering the water unfit for use at points farther down the stream.

In recent years there has been an urgent demand for some method of purifying waste water both for the purpose of recovering any valuable stock which it may contain, and also in order to prevent the pollution of the streams.

It is the object of this invention to provide an apparatus for separating out of the waste water the particles of solid material which it may contain, and particularly to provide means for removing coloring matter and the like from the water.

In the drawings there is shown a simple form of apparatus partially diagrammatic for carrying out the process which in part forms the subject-matter of this application.

In the following description of my invention and in the claims I use the term "loaded fluid" to describe the waste water as it comes from the machine carrying with it some particles of solid material.

Broadly considered my invention consists in conducting the loaded fluid into a chamber or tank and liberating in the fluid a large amount of gas in the form of very small, finely divided bubbles. These bubbles pass upwardly through the loaded fluid in an attempt to escape at its surface, and in their travel they attach themselves to the particles of solid material contained in the fluid, and carry these particles to the surface.

The gas is continuously supplied in the lower part of the tank and continuously exerts what might be termed a scouring action on the fluid carrying all of the solid material to the surface. If this process be carried on in a vessel without any inlets or outlets a well defined line of demarcation can be observed between the solid material which has all been collected and carried to the surface and the purified liquid underneath.

In the apparatus illustrated in the drawings *a* denotes a supply tank for loaded fluid. It is to be understood that in the actual operation of this machine it can be connected directly with the machine whose waste water is to be treated, or the waste water from any machine or machines can be pumped into a supply tank from which it passes to my separating apparatus.

*b* is a gas producing chamber and as illustrated it contains a set of electrodes 10 which are so arranged that the loaded material entering near the bottom of the tank is forced to travel up along one electrode plate, then down between the first and second electrode plates, then up between the second and third, and so on, the number of electrodes and their surface area being determined by the conditions of different cases, it being necessary only that they shall be sufficient in number and area to thoroughly subject the loaded fluid to electrolytic action to a sufficient extent for the purposes at hand. From this gas producing chamber the loaded fluid is carried to a tank *c* where it enters at the bottom. The minute bubbles of gas generated by the electrolytic action seek to escape at the surface of the fluid in this separating tank, and in their passage upward through the fluid they attach themselves to the particles of solid material and carry them to the surface of the liquid. The countless numbers of these minute gas bubbles exert what may well be termed a scouring action on the fluid as they travel from the bottom to the top of the tank, and the effect is to gather all of the solid material at the top of the tank where any suitable means can be provided for removing it.

I have illustrated in the drawings a series of scraper bars $d$ carried by an endless chain $e$ and which are so arranged as to sweep off from the top of the tank the solid material which has collected there. The clear fluid is drawn off from the bottom of the tank as at 20 and it is preferable to provide means such as a stopcock $f$ for determining the rate of flow. In some cases it is advisable to locate within the separating tank and just above the clear fluid outlet electrodes $g$ which establish an upward current of gas bubbles which clear away any solid material which may by accident gather in the neighborhood of the clear fluid outlet. These electrodes act as a sort of a screen, but it is not necessary to the satisfactory operation of the invention.

While I have illustrated herein an apparatus to supply gas by electrolytic action on the fluid, it is apparent that there are other ways in which gas can be supplied to the loaded fluid to effect the desired result, and I do not wish it to be understood that the invention is limited to supplying the gas by electrolytic action.

It is to be remembered that this process can be used for the separation of any finely divided particles of solid materials whether or not their specific gravity be greater or less than that of the fluid in which they are contained. In case the specific gravity of the particles of solid material be less than that of the fluid in which it is contained the normal separating action is accelerated, while in a case where the specific gravity of the particles of solid material is greater than that of the fluid in which it is contained the buoyant qualities of the gas carries the material to the surface.

It will thus be seen that there is provided a positively acting process of separation, and that the rapidity of the action can be varied and controlled to suit different conditions.

This process is particularly well adapted for use in connection with paper, cardboard, boxboard and like machinery, where large quantities of colored matter are used, to thoroughly and completely separate the pigment from the waste water making it possible to run the waste water into the streams without polluting them. Also the value of the pigment recovered is of considerable importance.

I claim:—

1. An apparatus for separating solid material from a fluid in which it is held in suspension comprising an electrolytic gas producing chamber in communication with a source of supply of loaded fluid, a separating chamber in communication with said gas producing chamber and adapted to receive the loaded fluid after it has been subjected to the electrolytic gas producing action, an outlet at the top of said separating chamber for the solid matter which has been carried to the surface of the fluid by the escaping gas bubbles, and a clear fluid outlet near the bottom of said chamber.

2. An apparatus for separating particles of solid material from the fluid in which they are held in suspension comprising a separating tank in communication with a source of supply of loaded fluid, electrodes connected with a suitable source of current and located in the path of the loaded fluid as it goes to the separating tank to subject it to electrolytic action for the purpose of producing minute bubbles of gas, an outlet at the top of said tank for the solid material which has been raised to the surface of the fluid by the escaping gas bubbles, an outlet near the bottom of said tank for the clear fluid and electrodes located just above said clear fluid outlet.

3. An apparatus for separating finely divided particles of solid material from the fluid in which they are carried in suspension comprising an electrolytic chamber in communication with a source of supply of loaded fluid, electrodes mounted in said chamber, means for causing the loaded fluid to pass between the electrodes in order that all parts of said fluid matter may be subjected to electrolytic action to produce minute bubbles of gas therein, a separating tank in communication with said electrolytic chamber, and adapted to receive the loaded fluid after it has been subjected to electrolytic action to permit the bubbles of gas as they rise through the liquid to escape at the surface to carry with them the particles of solid matter, an overflow for the solid material at the top of said tank, a clear fluid outlet near the bottom of said tank, and means for setting up electrolytic action within said tank at a point just above said fluid outlet.

HOWARD PARKER.

Witnesses:
  GEO. M. FRENCH,
  ROBERT A. FRENCH.